UNITED STATES PATENT OFFICE.

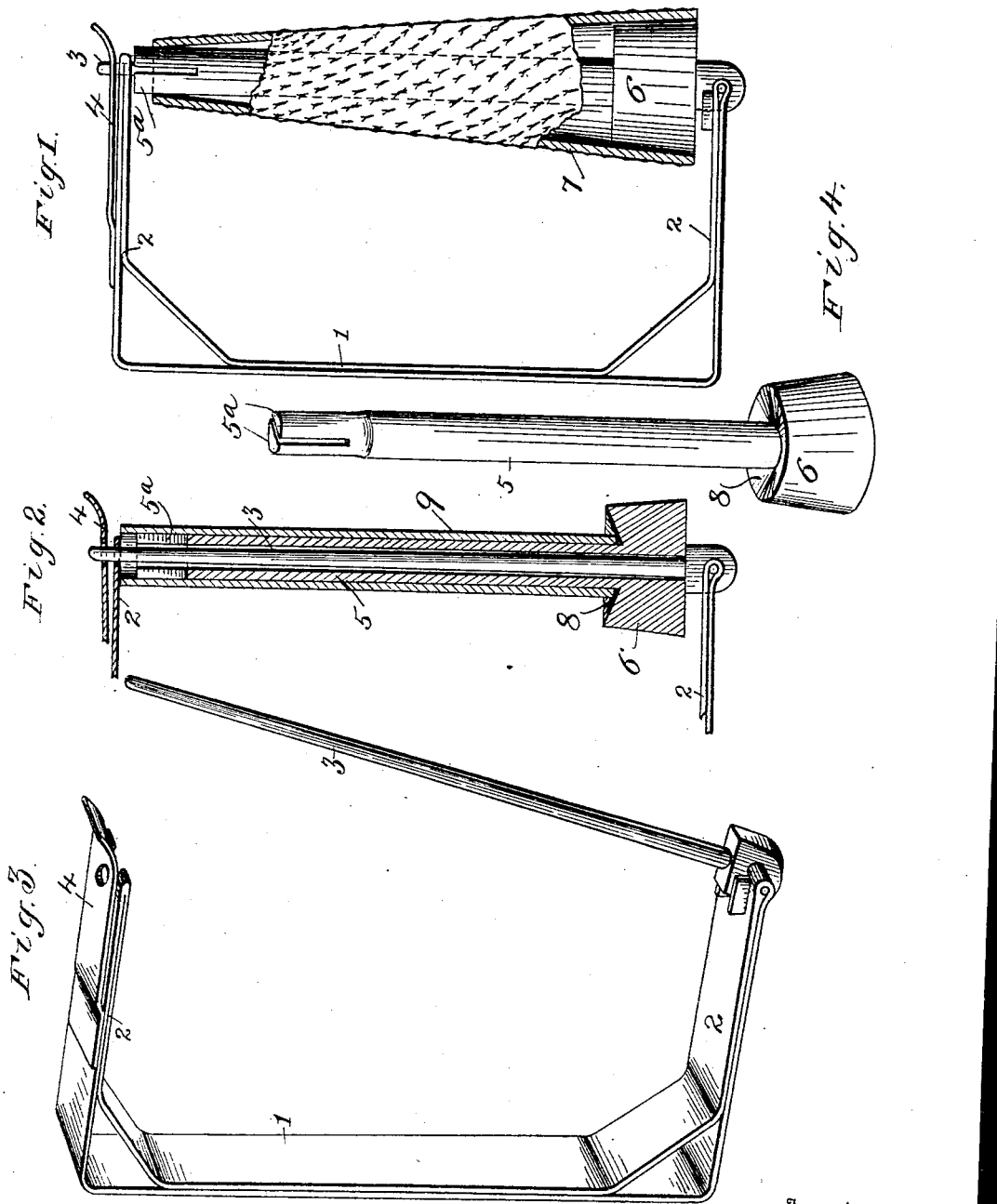

JAMES M. PINEGAR AND ROBERT E. PINEGAR, OF LAWRENCEBURG, TENNESSEE.

TWINE-HOLDER.

No. 904,722.

Specification of Letters Patent.

Patented Nov. 24, 1908.

Application filed February 11, 1908. Serial No. 415,387.

*To all whom it may concern:*

Be it known that we, JAMES M. PINEGAR and ROBERT E. PINEGAR, citizens of the United States, residing at Lawrenceburg, in the county of Lawrence and State of Tennessee, have invented certain new and useful Improvements in Twine-Holders, of which the following is a specification.

For commercial purposes wrapping twine is commonly wound upon pasteboard bases which are designed to be placed upon the spool of a twine holder when the twine is being used, and these pasteboard bases are sometimes of cylindrical formation and sometimes of conical formation.

The object of the present invention has particularly been to design a novel spool which can be employed with equal facility in connection with either the cylindrical or conical pasteboard bases upon which the twine is wound, thereby eliminating the necessity of employing independent spools for the different pasteboard bases.

For a full description of the invention and the merits thereof and also to acquire a knowledge of the details of construction and the means for effecting the result, reference is to be had to the following description and accompanying drawings, in which:

Figure 1 is a side elevation of a rack having the improved twine holder mounted thereon, a conical twine holding base being shown as applied to the spool. Fig. 2 is a longitudinal sectional view through the spool, parts of the rack being shown and a cylindrical twine holding base being arranged upon the spool. Fig. 3 is a perspective view of the rack, the spindle being swung outwardly. Fig. 4 is a detail perspective view of the spool.

Corresponding and like parts are referred to in the following description and indicated in all the views of the drawings by the same reference characters.

Referring to the drawing, the numeral 1 designates a twine rack which may be of any approved construction and comprises a pair of spaced arms 2 coöperating with each other to support the spindle 3 upon which the spool is loosely mounted. In the present instance one end of the spindle 3 is shown as hinged to one of the arms 2 while the opposite end is designed to be received within a notch at the extremity of the other arm 2 and to be held in position therein by means of a spring strip 4 secured to the arm and provided with an opening receiving the spindle. It will thus be apparent that by forcing the spring strip 4 outwardly the spindle 3 can be swung away from the arm for the purpose of removing the spool or placing the same in position.

Specifically describing the spool it will be observed that the same comprises a shank 5 which is of tubular formation and loosely receives the spindle 3. One end of the shank 5 is bifurcated and reduced in section to form the spring arms 5ª while the opposite end is provided with an enlargement 6. This enlargement is designed to fit within the flared end of the conical pasteboard bases 7 upon which the twine is wound and preferably has the form of the frustum of a cone. An annular depression 8 is formed in the upper face of the enlargement 6, the said depression surrounding the shank 5 and serving to receive one of the extremities of the cylindrical pasteboard bases upon which the twine may be wound as indicated at 9. Should the twine be upon one of the conical bases 7, the reduced end of the base is engaged by the spring arms 5ª while the flared end of the base is engaged by the frusto conical enlargement 6 at the opposite end of the shank. It will be readily apparent that should the twine be wound upon a cylindrical base the same can be readily slipped over the shank 5 in the usual manner, one end of the base being received within the depression 8.

From the foregoing description it will be readily apparent that the spool embodying the present invention can be employed with equal facility in connection with either the cylindrical or conical pasteboard bases upon which wrapping twine is commonly wound.

Having thus described the invention, what is claimed as new is:

A twine holder spool comprising a tubular shank designated to be loosely mounted upon a spindle, one end of the tubular shank being bifurcated to provide spring arms while the opposite end is formed with a frusto conical enlargement provided upon its upper face with an annular depression surrounding the tubular shank, the tubular shank being designed to receive a cylindrical twine holding base one end of which will project into the annular depression, while the frusto conical enlargement is designed to be received within the flared end of a conical twine holding base, the contracted end of the said conical base being engaged by the spring fingers.

In testimony whereof we affix our signatures in presence of two witnesses.

JAMES M. PINEGAR. [L. S.]
ROBERT E. PINEGAR. [L. S.]

Witnesses:
R. B. GLOVER,
E. E. McNELY.